July 11, 1967 D. C. GOODALL ETAL 3,330,192

PHOTOGRAPHIC TYPE-COMPOSING MACHINES

Original Filed July 2, 1963 2 Sheets-Sheet 1

United States Patent Office 3,330,192

Patented July 11, 1967

3,330,192

PHOTOGRAPHIC TYPE-COMPOSING MACHINES

Dennis C. Goodall, Salfords, near Redhill, Surrey, England, assignor to The Monotype Corporation Limited, London, England, a British company Continuation of application Ser. No. 292,231, July 2, 1963. This application Dec. 29, 1965, Ser. No. 534,254
3 Claims. (Cl. 95—4.5)

This application is a continuation of application S.N. 292,231, filed July 2, 1963, now abandoned.

The invention provides a photographic type-composing machine including means for projecting images of master characters in succession on to a photosensitive surface to form at least part of a composed line of character images thereon, which machine includes an optical member in the optical path between the position of the master character and the position of the photosensitive surface, which optical member is tiltable through a predetermined angle to displace the position of at least one selected character image across the photosensitive surface by a predetermined distance in a direction transverse to the line of character images, and actuating means connected to the optical member to tilt it as aforesaid.

The invention also provides a photographic type-composing machine including means for projecting images of master characters in succession on to a photo-sensitive surface to form at least part of a composed line of character images thereon, which machine includes an optically transmitting member through which the image-forming beam passes between the position of the master character and the position of the photosensitive surface, which optically transmitting member is tiltable through a predetermined angle to displace the position of one or more selected character images across the photosensitive surface by a predetermined distance in a direction trnsverse to the line of character images, and actuating means connected to the optically transmitting member to tilt it as aforesaid.

The invention also provides a photographic type-composing machine including means for projecting images of master characters in succession on to a photosensitive surface to form at least part of a composed line of character images thereon, which machine includes optical means in the optical path between the position of the master character and the position of the photosensitive surface which optical means is operable to displace the position of at least one selected character image across the photosensitive surface by a predetermined distance in a direction transverse to the line of character images, and means for preventing at will movement along the photosensitive surface in the direction of the aforesaid line of type of the position at which the images of successive characters of that line are projected, whereby at least two images, the position of at least one of which is displaced as aforesaid, may be successively projected in positions respectively spaced apart transversely of the line but not spaced apart along the line.

A specific embodiment of the invention will now be described by way of example and with reference to the accompanying drawings, in which.

Figures 1, 2:
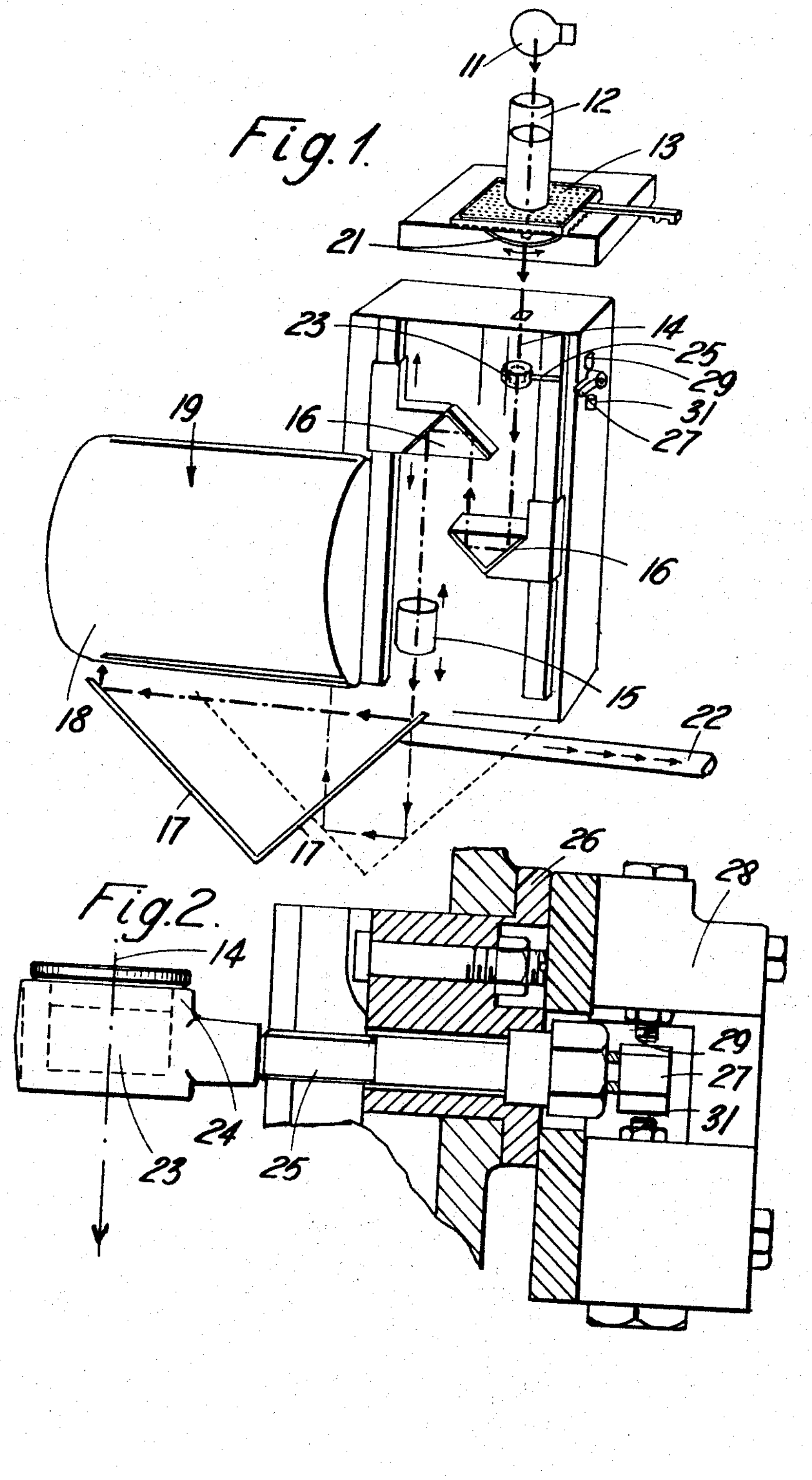
FIGURE 1 shows diagrammatically the optical system and certain associated parts of the mechanism of a photographic type composing machine.
FIGURE 2 is an elevation of the optical member of the machine and is partly a section on the line A—A of FIGURE 3.

The machine of this example is a modification of a photographic type-composing machine as sold under the registered trademark "Monophoto" and described in British patent specifications Nos. 563,331, 699,331, and 801,-873.

A lamp 11 and a condenser lens 12 project a beam of light through a master character in the form of a transparency, known as a matrix, along an optical path 14. A number of matrices are arrayed in a matrix case 13 which is moved to bring the desired matrix into the projection position in the beam of light. The beam passes through a projection lens 15 and two right angle prisms 16 and is reflected by a pair of mirrors 17 at right angles to each other and at 45° to the incident beam and forms an image of the matrix onto a photosensitive film 18 carried on a rotatable drum 19. This image is, in this example, a latent photographic image which is later developed to become visible. A shutter 21 obscures the beam between the projection of successive images, and during the time for which the beam is thus obscured the matrix case 13 is moved if necessary so that the matrix which is next to be projected lies in the correct position. Also between the projection of successive images the mirrors 17 are moved by means of a mirror bar 22 in a direction parallel to the axis of the drum 19 so that the images of successive characters projected on the film 18 are spaced apart laterally to form a justified line of type. The movements of the matrix case 13 and the mirror bar 22 are controlled in accordance with instructions coded in the form of perforations in a paper tape, and a pneumatic servo system is employed to translate those instructions into the necessary mechanical movements. The lens 15, and the prisms 16 may be in alternative positions along the optical path, depending upon the size of type to be printed.

Figure 3:
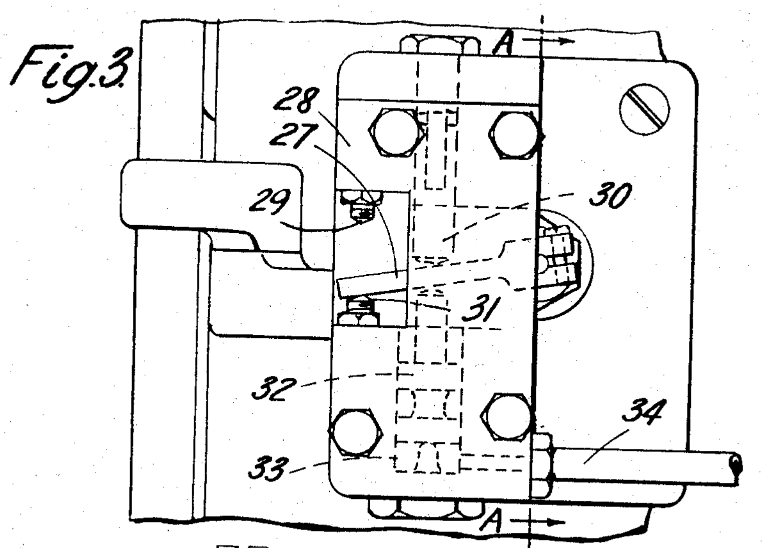
FIGURE 3 is a partly sectional side view of mechanism for tilting the optical member.

Positioned in the optical path 14 between the shutter and the lens 15 is an optical member in the form of a parallel sided optical flat 23. This flat is mounted in a ring 24 around its circumference which in turn is carried on a shaft 25 whose axis is perpendicular to the optical path 14. The shaft 25 is mounted in the casing of the machine by means of a bracket 26 for a limited amount of rotation about its own axis. The end of shaft 25 remote from the optical flat projects beyond the bracket 26 and carries a radial arm 27. The outermost portion of the arm 27 lies between stop surfaces 29 and 31 provided by the opposing end faces of two adjustable screws carried by a bracket 28 attached to the machine casing. Thus the optical flat 23 can be tilted about the axis of its shaft 25 to an extent limited by the abutment of the arm 27 with the upper stop surface 29 and the lower stop surface 31. The "normal" position of the optical flat is with the arm 27 abutting the lower stop surface 31 as shown in FIGURE 3. The flat is moved to its "shift" position with the arm 27 abutting the upper surface 29 by means of a pneumatically operated piston 32 and cylinder 33 working against a spring loaded plunger 30. The piston is capable of moving the arm 27 so that when air under pressure is supplied to the cylinder by means of pipe 34 in response to a "SHIFT" signal coded in the paper tape the optical flat is moved to its "shift" position until the "SHIFT" signal is discontinued.

Figures 4, 5, 6:
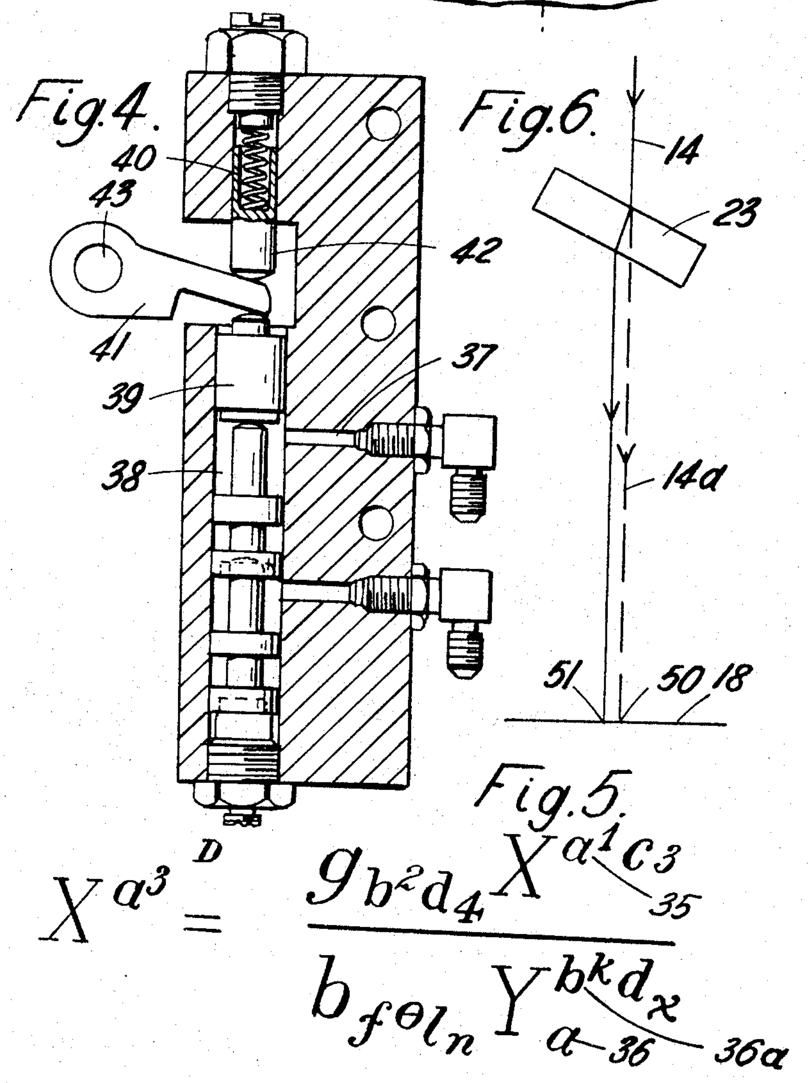
FIGURE 4 is a partly sectional elevation of part of the mechanism for preventing movement of the mirror bar.
FIGURE 5 shows some lines of type composed by use of the machine.
FIGURE 6 illustrates schematically the deviation of the light beam by the optical member.

In use of the machine, the optical flat usually remains in its "normal" position, the image forming beam passing through it undeviated, or deviated to a predetermined extent to form the images of successive characters in their normal positions in a line of type. When in response to the "SHIFT" signal compressed air is applied to the cylinder to tilt the optical flat to its "shift" position, illustrated in FIGURE 6 the beam of light 14 is thereby deviated from its normal path 14*a* in a direction such that the image of the character on the film is displaced to a position 51 vertically below (with respect to the printed line of type) its normal position 50. This displacement is illustrated in FIGURE 5. In the uppermost line of type the first order superior character "*a*" 35 has been printed from its matrix with the optical flat in its "normal" position. When the optical flat is tilted to its "shift" position the image projected from the same marix is displaced vertically downwards to a position which is shown in the lowermost line of type by the first order inferior character "*a*" 36.

Since it is required in certain instances to print superior and inferior characters one vertically above the other (with respect to the line of printed type) e.g. as illustrated by the superior character "*b*" 36*a* and the inferior character "*a*" 36 in the lowermost line of type in FIGURE 5. The mechanism of the composing machine is such that successive characters are printed laterally displaced from each other along the direction of the line of printed type, by moving the mirrors 17 by means of the mirror bar 22 in a direction along the line of type between successive exposures. Means are therefore provided to disconnect the mechanical drive to the mechanism moving the mirror bar in response to a signal coded in the perforated record tape. When such a signal (designated a "DOUBLE EXPOSE" signal) occurs, compressed air is fed by means of a pipe 37 to a cylinder 38 so that a piston 39 rises. This raises a trip lever 41 against the urging of a spring 40 pressing on the plunger 42 on the other side of the trip lever. When the trip lever 41 is thus raised the spindle 43 on which it is mounted is rotated. This has the action of disengaging the drive to the train of gears which moves the mirror bar. Similar mechanism is commonly used on "Monophoto" machines to prevent movement of the mirror bar for other purposes. When it is required to expose a first order inferior character immediately below the first order superior character the necessary "DOUBLE EXPOSE" and "SHIFT" signals are included in the record tape at the correct point so that the mirror bar remains stationary whilst the superior character is exposed with the optical flat in its normal position and the inferior character is then exposed with the optical flat in its shift position.

For example, in order to expose the characters "$H^2$" (first order superior $^2$) both the characters H and $^2$ are exposed with the optical flat in its normal position.

For the characters "$H_2$" (first order inferior $_2$), the character H is exposed normally, but the matrix of the first order superior "$^2$" is used with the "SHIFT" signal to expose the first order inferior "$_2$."

To expose the characters

"$H^2_2$"

(combined first order superior and inferior) after exposing the "H" normally, the first order superior "$^2$" matrix is exposed with both the "SHIFT" signal and "DOUBLE EXPOSE" signal to obtain the first order inferior "$_2$," and then the same matrix is exposed without the "SHIFT" and "DOUBLE EXPOSE" signals to obtain the first order superior "$^2$" immediately above the inferior "$_2$."

In some mathematical formulae in which the bottom line has more characters than the top, it is desired that the lines shall be justified as closely as possible relative to one another, so that they are of the same length. This is achieved by use of "SHIFT" and "DOUBLE EXPOSE" settings with the insertion of suitable spaces between the characters.

The invention is not restricted to the details of the foregoing example. For instance, the optical flat 23 may be arranged so that in its "shift" position it displaces the image of the character upwardly instead of downwardly with respect to the line of type.

A number of stop surfaces 29 may be provided in various positions to provide for different "shift" positions of the optical flat.

The type-composing machine described hereinbefore by way of example is suitable for use in the composition of mathematical formulae and the like, but the use of the machine is not limited to such composition and may include composition of chemical formulae and the setting of composite characters in alphabets such as Hebrew and Arabic (by way of example and not of limitation) as well as many industrial purposes such as printed circuits.

The type composing machine may also include optical means (e.g. a magnifying or diminishing lens) interposable at will in the optical path, to magnify or diminish the size of character projected on the film. This would enable a character, for example an integral sign or a parenthesis, to be projected from a standard size matrix to form an image on the film extending over two or more lines.

We claim:

1. A photographic type-composing machine including means for projecting images of master characters in succession onto a photosensitive surface to form at least part of a composed line of character images thereon, which machine includes an optical member in the optical path between the position of the master character and the position of the photosensitive surface, said optical member being positioned in a first, normal position to form said composed line of character images;

means for tilting said optical member through a fixed predetermined angle from said first, normal position to a second, shifted position, so as to displace the position of at least one selected character image across the photosensitive surface by a fixed predetermined distance in a direction transverse to the line of character images, said tilting means comprising a shaft member mounted to said optical member and first and second stop means corresponding to said normal and shifted positions of said optical member, said shaft member including arm means rotatable between said stop means, means for normally biasing said arm means against said first stop means so as to position said optical member in said normal position and means for rotating said arm means against said second stop means so as to position said optical member in said shifted position;

and variable magnification means disposed in the optical path between the optical member and the photosensitive surface for controlling the point size of the character images.

2. Apparatus as claimed in claim 1, including means for preventing at will movement along the photosensitive surface in the direction of the aforesaid line of type of the position at which the images of successive characters of that line are projected, whereby at least two images, the position of at least one of which is displaced as aforesaid, may be successively projected in positions respectively spaced apart transversely of the line but not spaced apart along the line.

3. Apparatus as claimed in claim 2 wherein said means for projecting master character images in succession onto said photosensitive surface includes a pair of mirrors mounted at right angles to each other and at 45° to the projected light beam, and drive means for moving said mirrors between successive image projections so that the images of said successive characters projected on said photosensitive surface are spaced apart laterally to form a line of type;

and wherein said means for preventing at will movement of said projected images includes means for disengaging said drive means for said mirrors.

References Cited

UNITED STATES PATENTS

| | | | |
|---|---|---|---|
| 2,233,441 | 3/1941 | Whittaker | 88—24 |
| 2,388,961 | 11/1945 | Elliott | 95—4.5 |
| 2,672,794 | 3/1954 | Freund | 95—4.5 |
| 2,701,991 | 2/1955 | Croucher | 95—4.5 |
| 2,888,865 | 6/1959 | Garth | 95—4.5 |
| 3,224,349 | 12/1965 | Schumann | 95—4.5 |

JOHN M. HORAN, *Primary Examiner.*